(12) United States Patent
Muta

(10) Patent No.: US 10,013,812 B2
(45) Date of Patent: Jul. 3, 2018

(54) METHOD AND SYSTEM FOR CONTROLLING A HEAD-MOUNTED DISPLAY SYSTEM

(71) Applicant: COLOPL, Inc., Tokyo (JP)

(72) Inventor: Sadaharu Muta, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/455,078

(22) Filed: Mar. 9, 2017

(65) Prior Publication Data

US 2017/0263058 A1 Sep. 14, 2017

(30) Foreign Application Priority Data

Mar. 10, 2016 (JP) ................. 2016-047584

(51) Int. Cl.
| | | |
|---|---|---|
| *G06T 19/20* | (2011.01) | |
| *G06F 3/01* | (2006.01) | |
| *A63F 13/42* | (2014.01) | |
| *A63F 13/525* | (2014.01) | |

(52) U.S. Cl.
CPC .............. *G06T 19/20* (2013.01); *A63F 13/42* (2014.09); *A63F 13/525* (2014.09); *G06F 3/012* (2013.01); *G06F 3/013* (2013.01); *A63F 2300/8082* (2013.01)

(58) Field of Classification Search
None
See application file for complete search history.

(56) References Cited

U.S. PATENT DOCUMENTS

2014/0186002 A1 7/2014 Hanaya et al.
2015/0281680 A1* 10/2015 Grafenberg .......... H04N 13/004
348/50

FOREIGN PATENT DOCUMENTS

JP 2014-127987 A 7/2014

* cited by examiner

*Primary Examiner* — Gustavo Polo
(74) *Attorney, Agent, or Firm* — Hauptman Ham, LLP

(57) ABSTRACT

A method includes defining a virtual space and a virtual camera for determining a field of view region at a first position in the virtual space. The method includes specifying a reference slight line of the user and a direction of the virtual camera. The method includes generating a field of view image corresponding to the field of view region and outputting the field of view image. The method includes receiving a movement input for specifying a movement destination of the virtual camera. The method includes specifying a temporal state of the movement input. The method includes moving the virtual camera from the first position to a second position in the virtual space based on the temporal state. The method includes generating an updated field of view image based on the virtual camera reaching the second position and outputting the updated field of view image.

20 Claims, 16 Drawing Sheets

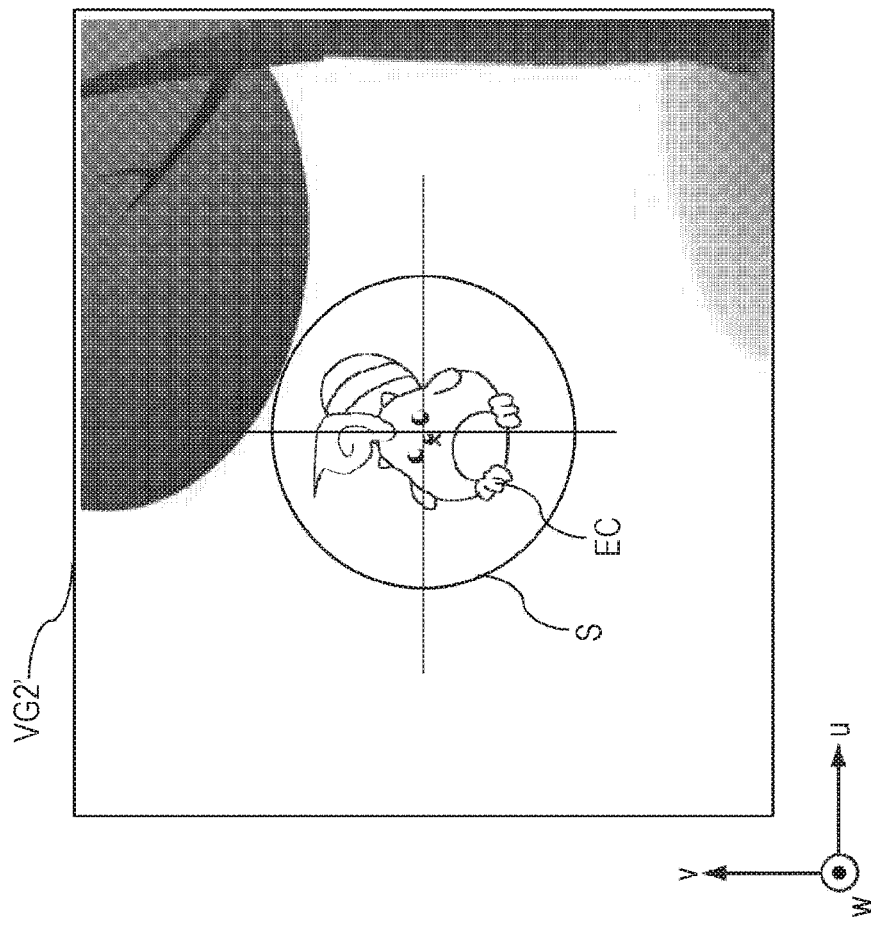
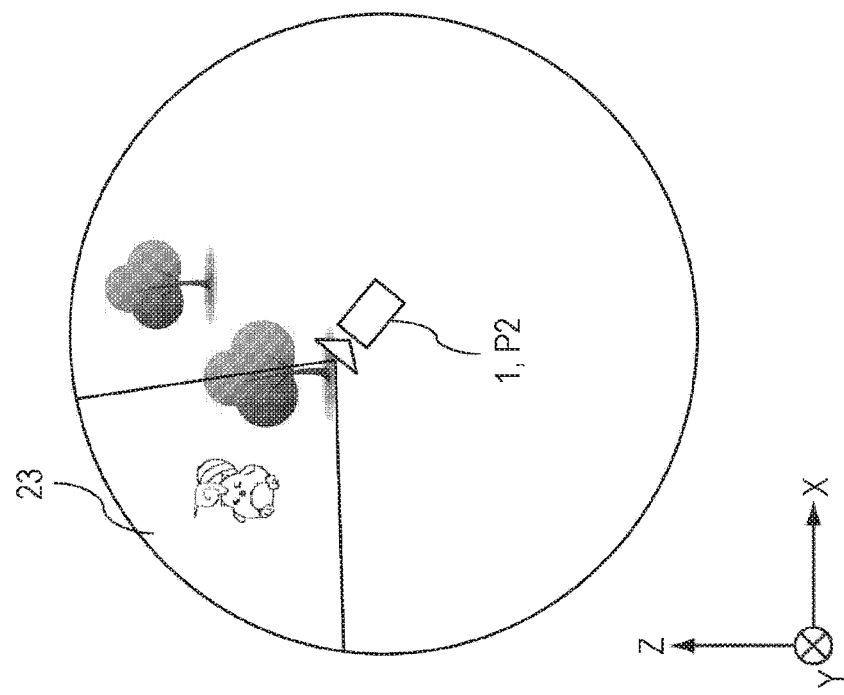

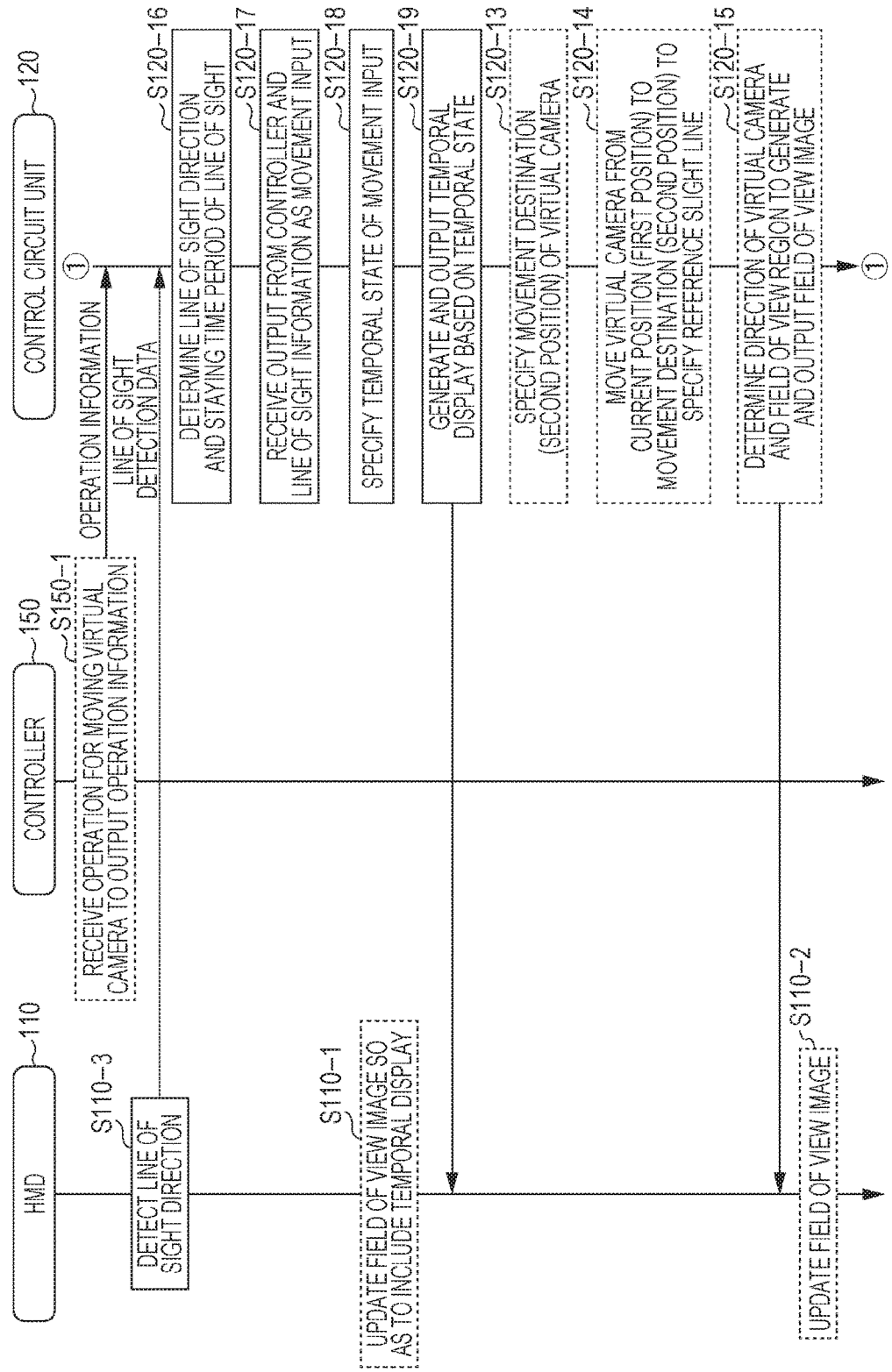

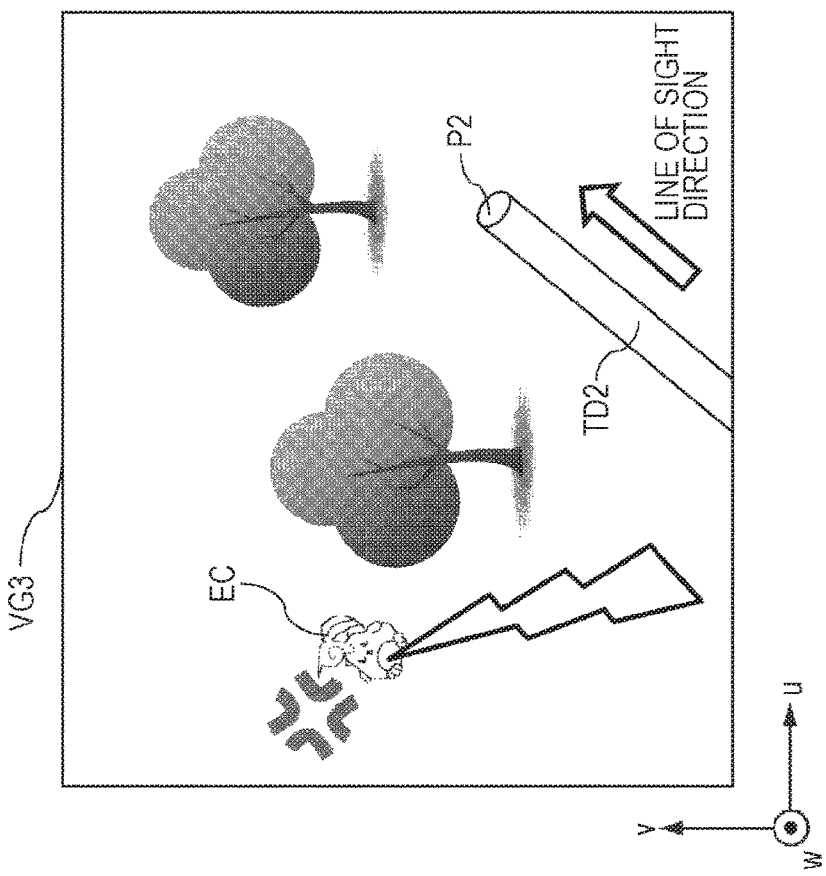
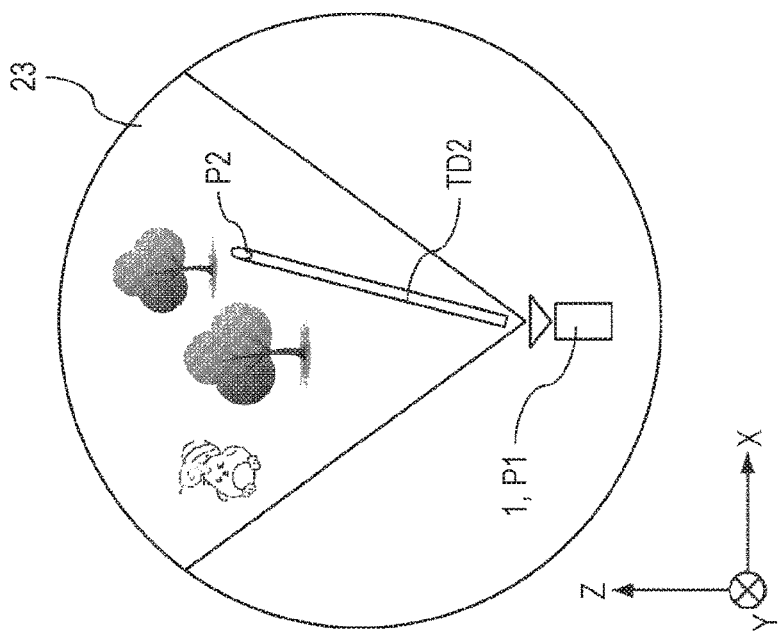
FIG. 16A
FIG. 16B

METHOD AND SYSTEM FOR CONTROLLING A HEAD-MOUNTED DISPLAY SYSTEM

RELATED APPLICATIONS

The present application claims priority to Japanese Application Number 2016-047584, filed Mar. 10, 2016, the disclosure of which is hereby incorporated by reference herein in its entirety.

BACKGROUND

This disclosure relates to a method and system for causing a computer to provide a virtual space for a user with use of a head-mounted display (HMD).

In Japanese Patent Application Laid-open No. 2014-127987, there is disclosed a technology of switching a point of view when video content is provided to a user with use of an HMD from a third-person perspective to a first-person perspective being a point of view of an imaged object that appears in the video content.

In providing virtual reality (VR) content in which a field of view is changed in synchronization with a movement of a head of the user wearing the HMD, unlike the case where the video content is enjoyed with the HMD as disclosed in Japanese Patent Application Laid-open No. 2014-127987, attempts to avoid degradation of the entertainment value when the position of the point of view is changed. In a case of providing, for example, an action game, a user's character being able to freely move around the VR space increases enjoyment. However, when no limitation is placed on the movement, the user's character may be able to freely move to, for example, a back side of an enemy character, and thus there may be a loss of enjoyment of elaborating a strategy for completing the game.

SUMMARY

This disclosure has an object to improve an entertainment value in a virtual space provided to a head-mounted display system.

According to at least one embodiment of this disclosure, there is provided a method of providing a virtual space to a user by a head-mounted display (hereinafter referred to as "HMD") using a computer. The method includes defining the virtual space for immersing the user. The method further includes defining a virtual camera at a first position in the virtual space, wherein the virtual camera determines a field of view region. The method further includes specifying a reference slight line. The method further includes specifying a direction of the virtual camera based on the reference slight line. The method further includes generating a field of view image corresponding to the field of view region in the virtual space and outputting the field of view image to the HMD. The method further includes receiving a movement input for specifying a movement destination of the virtual camera. The method further includes specifying a temporal state of the movement input. The method further includes moving the virtual camera from the first position to a second position in the virtual space based on the temporal state. The method further includes updating the field of view region in response to moving the virtual camera to the second position. The method further includes generating an updated field of view image based on the updated field of view region and outputting the updated field of view image to the HMD.

According to this disclosure, a virtual space having a high entertainment value is able to be provided.

BRIEF DESCRIPTION OF THE DRAWINGS

FIG. 14A and FIG. 14B are diagrams of a virtual space in a state in which a virtual camera is arranged at the second position according to at least one embodiment of this disclosure.

FIG. 15 is a flow chart of processing to be executed in an HMD system according to at least one embodiment of this disclosure.

FIG. 16A and FIG. 16B are diagrams of a virtual space in a state in which a virtual camera is arranged at the first position according to at least one embodiment of this disclosure.

DETAILED DESCRIPTION

Figure 1:
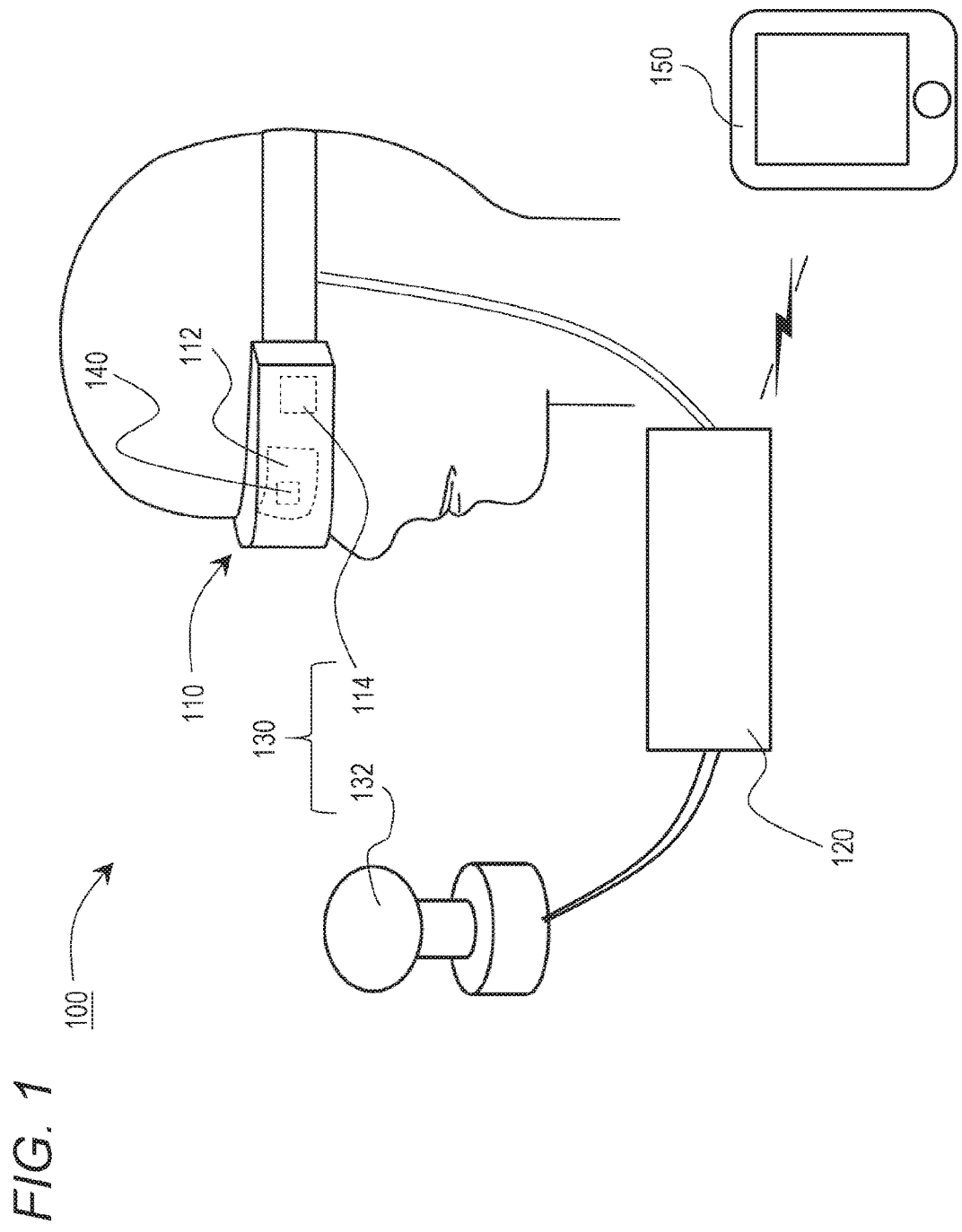
FIG. 1 is a diagram of an HMD system according to at least one embodiment of this disclosure.

First, at least one embodiment of this disclosure is described by enumerating contents thereof. A method and system for controlling an HMD according to at least one embodiment of this disclosure include the following configurations.

(Item 1)

A method of providing a virtual space to a head-mounted display (HMD) using a computer. The method includes defining the virtual space for immersing a user. The method further includes defining a virtual camera for determining a field of view region at a first position in the virtual space. The method further includes specifying a reference slight line of the user. The method further includes specifying a direction of the virtual camera based on the reference slight line. The method further includes generating a field of view image corresponding to the field of view region in the virtual space for outputting the field of view image to the HMD. The method further includes receiving a movement input for specifying a movement destination of the virtual camera. The method further includes specifying a temporal state of the movement input. The method further includes moving the virtual camera from the first position to a second position in the virtual space based on the temporal state. The method further includes updating the field of view region in response to arranging the virtual camera at the second position. The method further includes generating an updated field of view image based on the updated field of view region and outputting the updated field of view image to the HMD.

According to the method, the virtual camera is moved based on the temporal state of the movement input, and the timing to perform the movement input depends on a set mode of the second position. For example, in an action game, the operation of performing movement input may create an unguarded moment to be targeted by an enemy character or the like. In order to reduce the risk of the unguarded moment or another suitable undesirable movement, the timing to perform the movement input is determined. Therefore, a virtual space having a high entertainment value may be provided.

(Item 2)

A method according to Item 1, in which the movement input is received from a controller connected to the HMD.

According to the method, a virtual space having a high entertainment value may be provided with use of the controller.

(Item 3)

A method according to Item 2, in which the output includes information for specifying a duration for which input to the controller is continued. The temporal state is a duration for which the input is continued. The second position is set to be farther from the first position as the duration for which the input is continued is increased.

According to the method, a virtual space having a high entertainment value may be provided with use of the controller.

(Item 4)

A method according to Item 2, in which the output includes information for specifying a number of times that an input to the controller is executed within a predetermined time period. The temporal state is the number of times that the input is executed within the predetermined time period. The second position is set to be farther from the first position as the number of times the input is executed within the predetermined time period is increased.

According to the method, a virtual space having a high entertainment value may be provided with use of the controller.

(Item 5)

A method according to any one of Items 1 to 4, further including detecting an inclination of the HMD to specify a field of view direction, and/or specifying a line of sight direction of the user. The reference slight line is specified based on the field of view direction and/or the line of sight direction. The movement input includes information for specifying a duration for which one of the field of view direction and the line of sight direction is unchanged. The temporal state is the duration for which the one of the field of view direction or the line of sight direction remains unchanged. The second position is set to be farther from the first position as the duration for which the one of the field of view direction or the line of sight direction remains unchanged increases.

According to the method, a virtual space having a high entertainment value may be provided also in consideration of the direction in which the user directs his or her attention.

(Item 6)

A method according to any one of Items 1 to 5, further including detecting an inclination of the HMD to specify a field of view direction, and/or specifying a line of sight direction of the user. The reference slight line is specified based on the field of view direction and/or the line of sight direction. The method further includes displaying a temporal display that is based on the temporal state in one of the field of view direction and the line of sight direction.

According to the method, the user is able to predict the direction in which the virtual camera is moved in response to the movement input based on the temporal display. Therefore, a visually induced motion sickness (so-called VR sickness) due to the movement of the virtual camera may be alleviated, in some instances.

(Item 7)

A method according to Item 6, further including displaying the temporal display between the virtual camera and the second position.

According to the method, a visually induced motion sickness due to the movement of the virtual camera may be alleviated, in some instances.

(Item 8)

A method according to Item 6 or 7, further including displaying the temporal display such that the temporal display is extended from the virtual camera to the second position.

According to the method, a visually induced motion sickness due to the movement of the virtual camera may be alleviated, in some instances.

(Item 9)

A system for executing the method of any one of Items 1 to 8.

Examples of a method and system for controlling an HMD according to at least one embodiment of this disclosure are described below with reference to the drawings. This disclosure is not limited to those examples, and is defined by the appended claims. One of ordinary skill in the art would understand that this disclosure includes all modifications within the appended claims and the equivalents thereof. In the following description, like elements are denoted by like reference symbols in the description of the drawings, and redundant description thereof is not repeated.

FIG. 1 is an illustration of an HMD system 100. The HMD system 100 includes an HMD 110 to be worn on a head of a user, a control circuit unit 120, a movement sensor 130, an eye gaze sensor 140, and a controller 150.

The HMD 110 includes a display 112 that is a non-transmissive (or partially transmissive) display device, a sensor unit 114, and the eye gaze sensor 140. The control circuit unit 120 is configured to cause the display 112 to display a right-eye image and a left-eye image, to thereby provide a three-dimensional image using binocular parallax as a virtual space. The display 112 is arranged in front of the user's eyes, and thus the user is able to be immersed to the virtual space. The virtual space includes a background, various objects that can be operated by the user, menu images, and the like.

The display 112 may include a right-eye sub-display configured to provide a right-eye image, and a left-eye sub-display configured to provide a left-eye image. Further, as long as the right-eye image and the left-eye image can be provided, the display 112 is constructed of one display device, in at least one embodiment. For example, a shutter configured to enable recognition of a display image with only one eye at a time may be switched at high speed, to thereby independently provide the right-eye image and the left-eye image.

Figure 2:
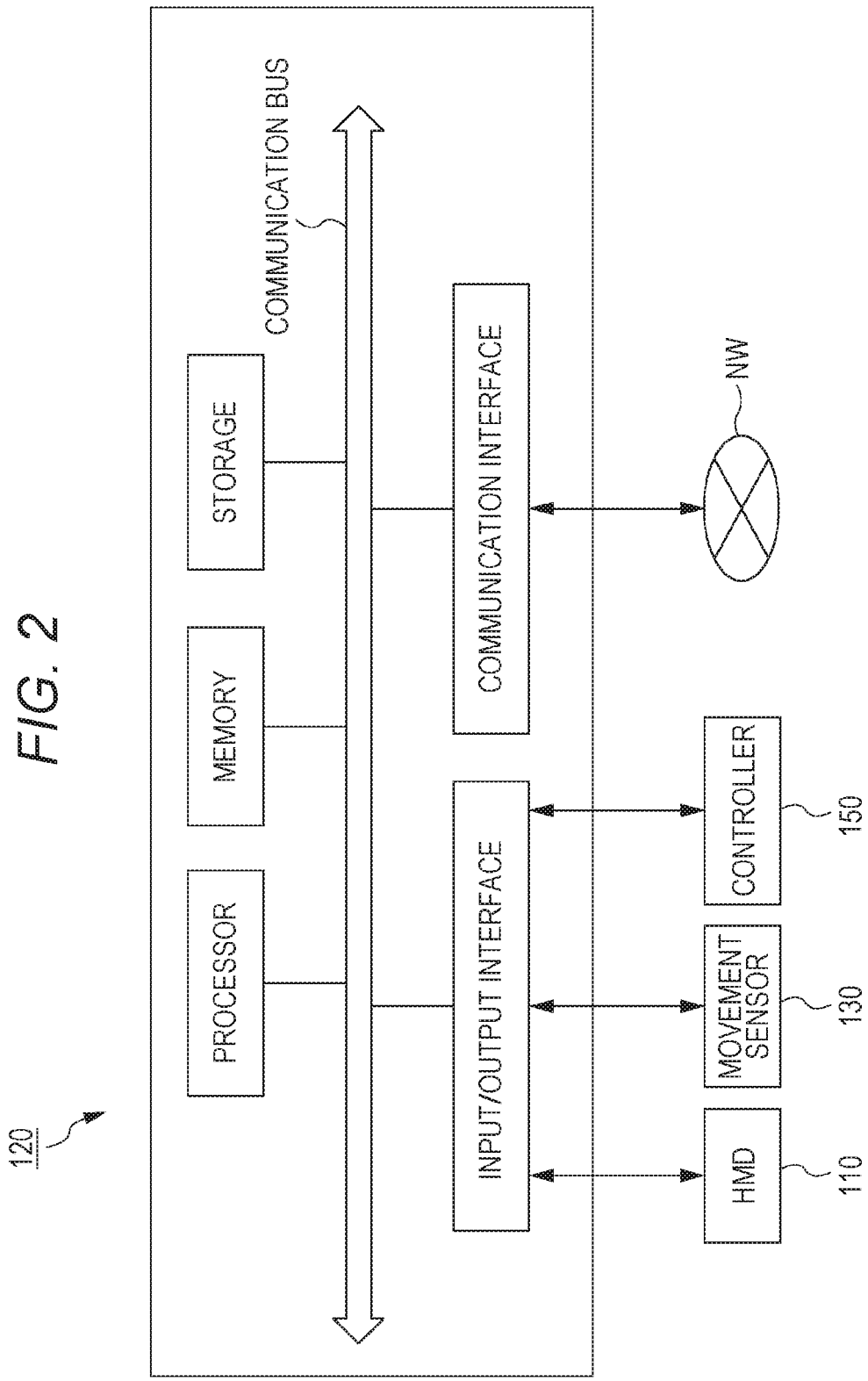
FIG. 2 is a diagram of a hardware configuration of a control circuit unit according to at least one embodiment of this disclosure.

The control circuit unit 120 is a computer for causing the HMD 110 to provide a virtual space. In FIG. 2, the control circuit unit 120 includes a processor, a non-transitory memory, a storage, an input/output interface, and a communication interface, which are connected to each other via a bus serving as a data transmission path. The processor includes a central processing unit (CPU), a micro-processing unit (MPU), a graphics processing unit (GPU), or the like, and is configured to control the operation of the control circuit unit 120 and HMD system 100. The non-transitory memory functions as a main storage, and is configured to temporarily or permanently store programs to be processed by the processor and control data such as calculation parameters. The memory may include a read only memory (ROM), a random access memory (RAM), or the like. The storage functions as an auxiliary storage, and is configured to store programs for controlling the operation of the HMD system 100, various simulation programs and user authentication programs, and further, data relating to various images and objects for defining the virtual space. Further, a database including tables for managing various kinds of data may be stored in the storage. The storage may include a flash memory, a hard disk drive (HDD), or the like. The input/output interface includes various wire connection terminals such as a universal serial bus (USB) terminal, a digital visual interface (DVI) terminal, or a high-definition multimedia interface (HDMI) terminal, or various processing circuits for wireless connection. The input/output interface 210 is configured to connect the HMD 110, various sensors including the movement sensor 130, the controller 150, and the like to each other. The communication interface includes various wire connection terminals for communicating to/from an external device via a network NW, and various processing circuits for wireless connection. The communication interface is configured to adapt to various communication standards or protocols for communication via a local area network (LAN) or the Internet.

The control circuit unit 120 is configured to load an application stored in the storage to the memory to execute the program, to thereby output the virtual space to the display 112 of the HMD 110. Further, the memory or the storage stores programs for operating various objects to be displayed in the virtual space, or for displaying and controlling various menu images and the like. The control circuit unit 120 is not required to be mounted on the HMD 110, and may be constructed as different hardware (for example, a computer, or a server computer via a network) and may have one or a plurality of functions implemented by a plurality of pieces of hardware, in at least one embodiment. Further, a part of the control circuit unit 120 may be mounted on the HMD 110, and another part thereof may be mounted at a different location, in at least one embodiment.

Figure 3:
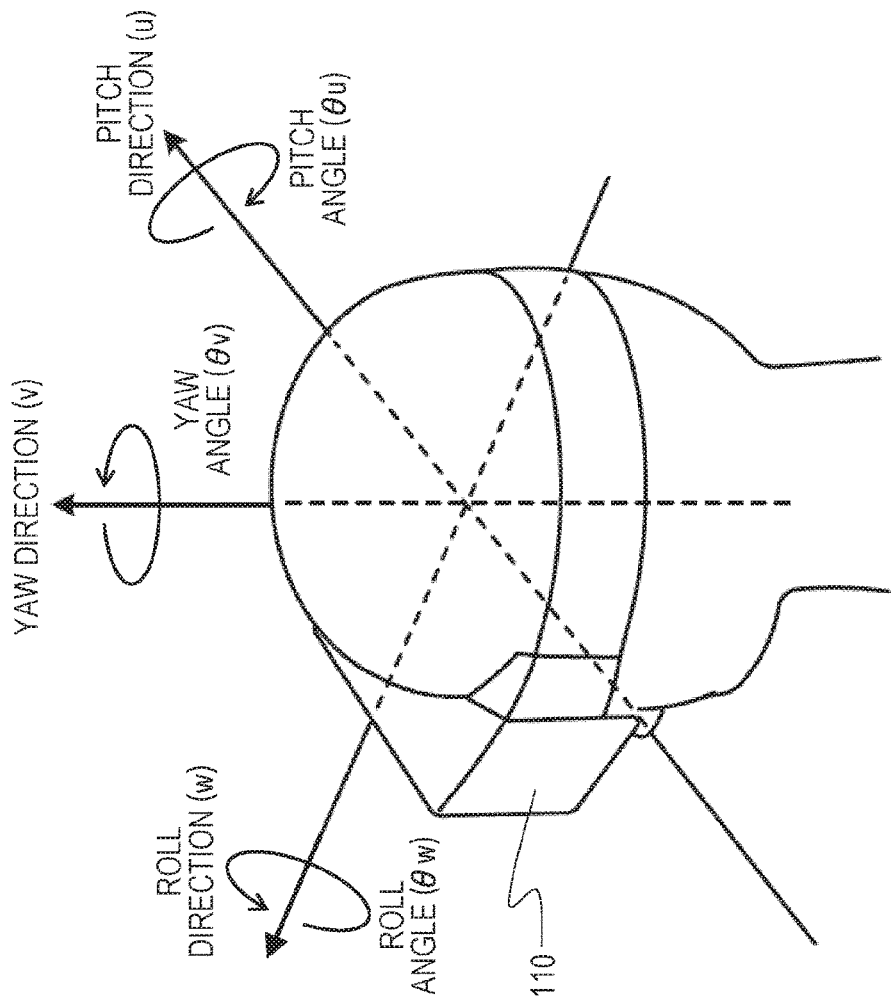
FIG. 3 is a diagram of a visual field coordinate system of a user wearing an HMD according to at least one embodiment of this disclosure.

The movement sensor 130 is configured to detect information relating to a position and an inclination of the HMD 110. FIG. 3 is an example of detection data of the position and the inclination of the HMD 110 to be acquired by the movement sensor 130. A three-dimensional UVW visual field coordinate system is defined about the head of the user wearing the HMD 110. A perpendicular direction in which the user stands upright is defined as a yaw direction (v), a front-rear direction being orthogonal to the yaw direction and connecting between the user and the center of the display 112 is defined as a roll direction (w), and a lateral direction orthogonal to the yaw direction and the roll direction is defined as a pitch direction (u). With this, temporal changes of the position and the inclination of the user in the three-dimensional space are acquired. Further, a pitch angle ($\theta u$) being an inclination angle of the HMD 110 about the pitch direction, a yaw angle ($\theta v$) being an inclination angle of the HMD 110 about the yaw direction, and a roll angle ($\theta w$) being an inclination angle of the HMD 110 about the roll direction are acquired.

The movement sensor 130 includes the sensor unit 114 and a detection unit 132. The sensor unit 114 may include a plurality of light sources. The light source is, for example, an LED configured to emit light, such as an infrared light. The detection unit 132 is, for example, an infrared sensor, and is configured to detect the infrared light from the light source as a detection point of the HMD 110, to thereby detect over time information relating to a position and an angle in a real space of the HMD 110 based on the movement of the user. Then, the time change of the position and the angle of the HMD 110 can be determined by the control circuit unit 120 based on the temporal change of the information detected by the detection unit 132, and thus information relating to the movement of the HMD 110 can be specified. The position of the HMD 110 in the real space may be specified as a relative position with respect to the detecting unit 132 based on the light intensity of the infrared light or a relative positional relationship between the plurality of detection points (for example, a distance between the detection points), which is acquired by the detecting unit 132. An origin position of the UVW visual field coordinate system, i.e., U=0; V=0; and W=0, may be specified based on a specified position of the HMD 110 in the real space. Further, the inclination of the HMD 110 in the real space may be specified based on the relative positional relationship between detection points of the plurality of detection points and the position of the detection points of the plurality of detection points at the origin position, to thereby specify the direction of the UVW visual field coordinate system.

The movement sensor 130 may be constructed of only one of the detection unit 132 or the sensor unit 114 fixed near the display 112. The sensor unit 114 may be a geomagnetic sensor, an acceleration sensor, or a gyrosensor, and is configured to use at least one of those sensors to detect the position and the inclination of the HMD 110 worn on the head of the user. With this, the information relating to the position and the movement of the HMD 110 can be detected. For example, the angular velocity sensor can detect over time the angular velocity about three axes of the HMD 110 based on the movement of the HMD 110 to determine the time change of the angle about each axis. In at least one embodiment, the detection unit 132 is omitted. Further, the detection unit 132 may include an optical camera. The information relating to the movement of the HMD 110 can be detected based on the image information, and thus the sensor unit 114 is omitted, in at least one embodiment.

Figure 4:
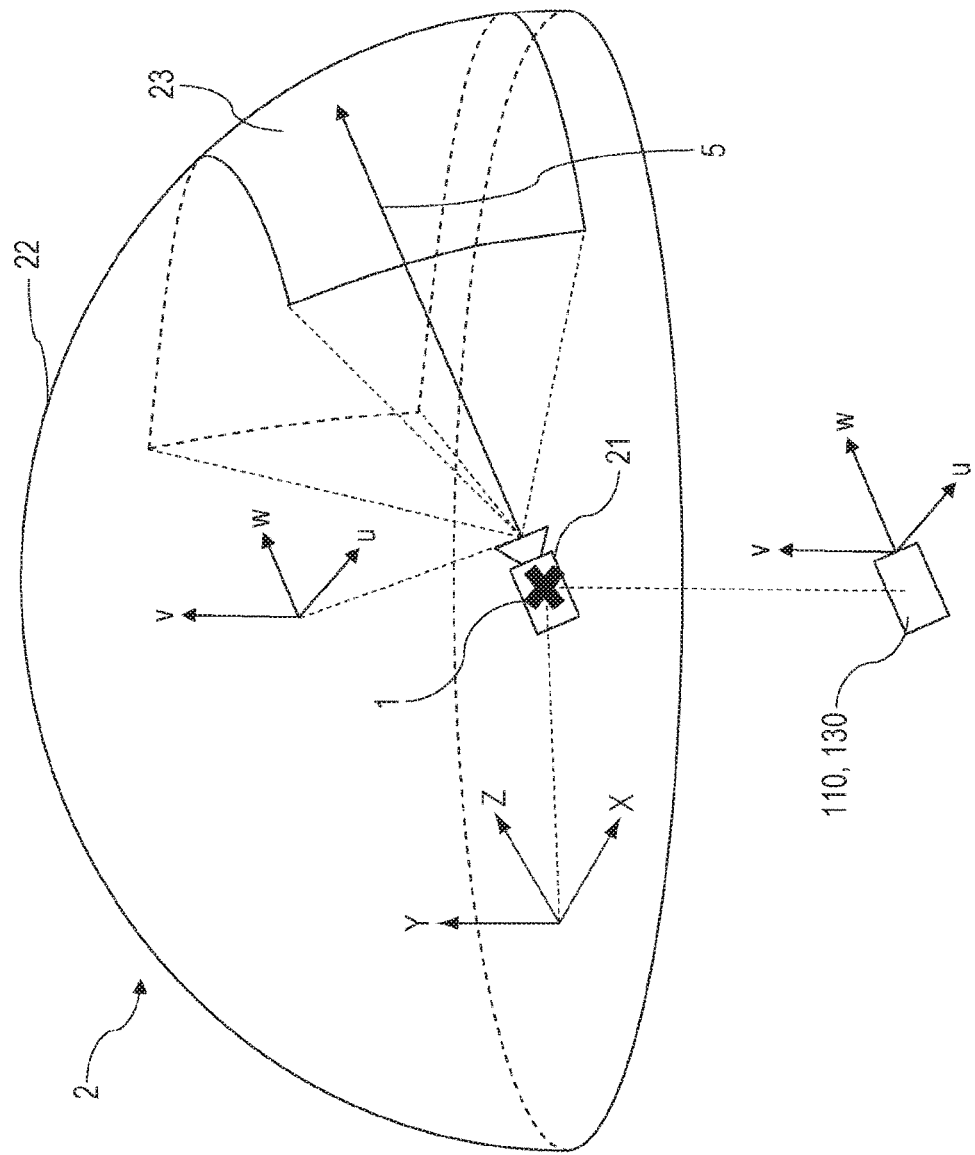
FIG. 4 is a diagram of an XYZ space representing an example of a virtual space according to at least one embodiment of this disclosure.

FIG. 4 is a diagram of the relationship between the HMD 110 (movement sensor 130) and a virtual space 2 to be provided by the control of the control circuit unit 120. The virtual space 2 is defined as an entire celestial sphere shape covering a center 21 in any 360-degree direction (in FIG. 4, only the upper-half celestial sphere is illustrated). A plurality of substantially-square or substantially-rectangular mesh sections are associated with the celestial sphere, and an image of video content or the like is rendered to provide the virtual space 2 in a visually recognizable manner. The virtual space 2 is associated with an XYZ space coordinate system having the center 21 as the origin, and space information in the virtual space 2 of each mesh section is specified. In this embodiment, in an initial state, a virtual camera 1 is arranged at the center 21, and the position and the direction of the virtual camera 1 are specified in synchronization with the movement of the HMD 110. Therefore, the UVW visual field coordinate system of the virtual camera 1 in the virtual space 2 is defined so as to synchronize with the UVW visual field coordinate system of the HMD 110 in the real space. Further, the virtual camera 1 is movable in the virtual space 2 in synchronization with the movement of the user wearing the HMD 110 in the real space. Then, in the virtual space 2, a field of view region 23 to be visually recognizable by the user as being projected on the display 112 of the HMD 110 is specified based on the position and the direction of the virtual camera 1 in the virtual space 2.

In at least one embodiment, the virtual camera 1 includes a right-eye virtual camera configured to provide a right-eye image and a left-eye virtual camera configured to provide a left-eye image. In at least one embodiment, an appropriate parallax is set for the two virtual cameras so that the user is able to recognize the three-dimensional virtual space 2. In at least one embodiment, as a representative implement of the virtual cameras, only a virtual camera 1 that generates the roll direction (W) by combining the roll directions of the two virtual cameras is adapted to the roll direction (W) of the HMD 110 is illustrated and described. One of ordinary skill in the art would understand that virtual camera 1 is also able to generate the pitch direction (U) and the yaw direction (V) in a manner similar to that described with respect to the roll direction (W).

Figure 5:
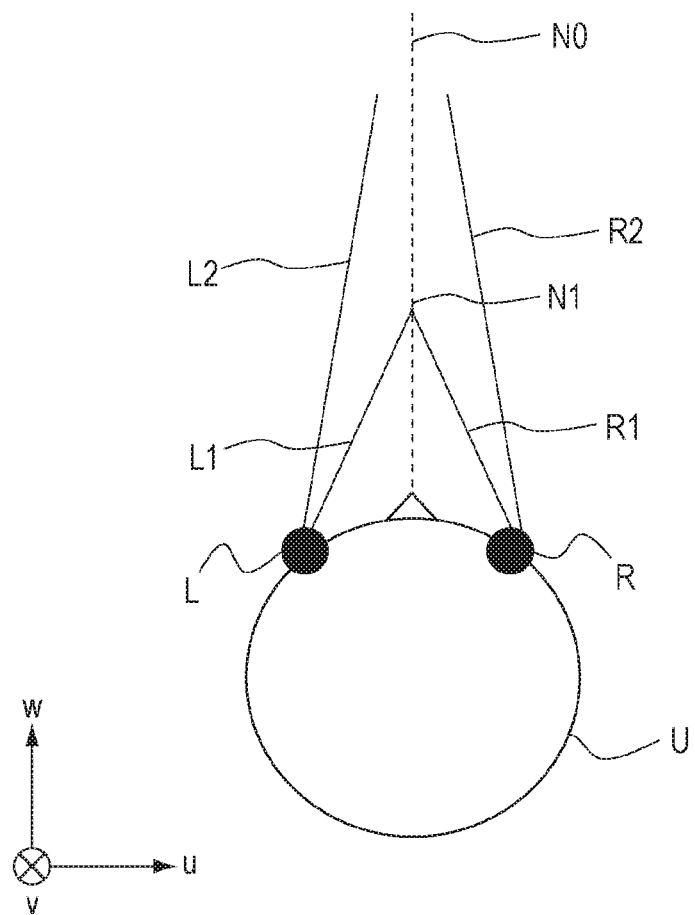
FIG. 5 is a diagram of a method of determining a line of sight direction according to at least one embodiment of this disclosure.

The eye gaze sensor 140 has an eye tracking function of detecting directions of lines of sight of the user's eyes. In FIG. 5, the eye gaze sensor 140 is configured to detect line of sight directions of a right eye and a left eye of a user U. When the user U is looking at a near place, lines of sight R1 and L1 are detected, and a point of gaze N1 being an intersection of the lines of sight R1 and L1 is specified. Further, when the user is looking at a far place, lines of sight R2 and L2, which form smaller angles with the roll direction (W) as compared to the lines of sight R1 and L1, are specified. After the point of gaze N1 is specified, a line of sight direction N0 of the user U is specified. The line of sight direction N0 is a direction in which the line of sight of the user U is actually directed with both eyes. The line of sight direction N0 is defined as, for example, an extension direction of a straight line that passes through the center point N1 and the midpoint of the right eye R and the left eye L of the user U. The eye gaze sensor 140 can employ a sensor having an eye tracking function. For example, infrared light may be radiated to each of the right eye and the left eye to acquire reflection light from the cornea or the iris, to thereby obtain a rotational angle of the eyeball. The eye gaze sensor 140 is preferred to include a right-eye sensor and a left-eye sensor.

The controller 150 is a device to be connected to the control circuit unit 120 so as to enable transmission of various instructions, and may be a portable terminal capable of performing wired or wireless communication. Examples of the controller 150 include a smart phone, a personal digital assistant (PDA), a tablet computer, a game console, or a computer. In at least one embodiment, the controller 150 includes a touch panel. In at least one embodiment, a terminal including a touch panel in which a processor, a memory, a storage, a communication unit, a display unit, and an input unit, which are connected to each other via a bus, are integrally constructed. The user can input various touch operations including tapping, swiping, and holding, to the touch panel of the controller 150, to thereby affect a user interface (UI) or various objects arranged in the virtual space 2.

The HMD system 100 may include a microphone or a speaker in any of the elements. With this, the user can give instructions with voice to the virtual space 2. Further, the HMD system 100 may include a television receiver in any of the elements in order to receive a broadcast of a television program on a virtual television in the virtual space. Further, the HMD system 100 may have a communication function or the like in order to display an electronic mail or the like that the user has acquired.

Figure 6:
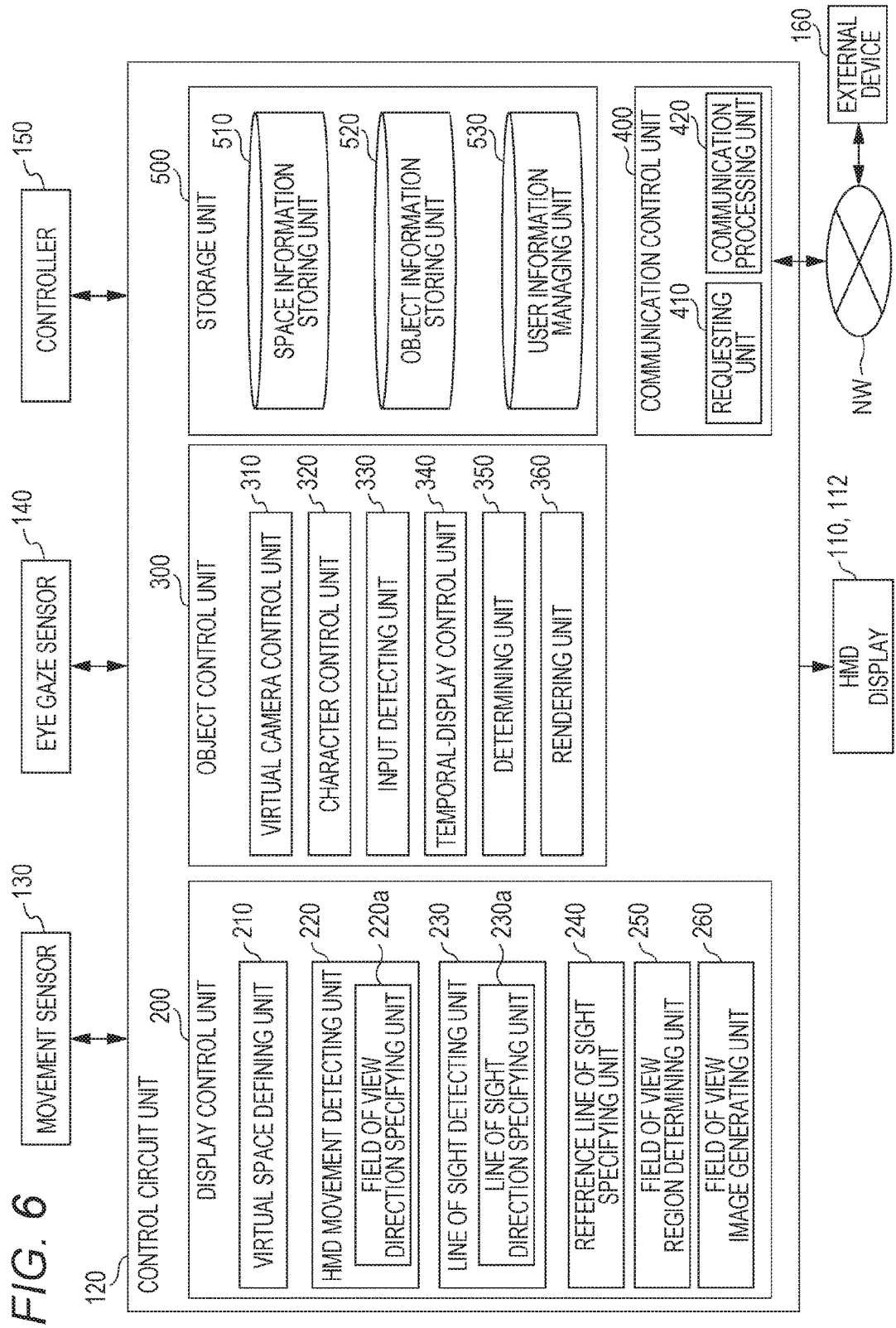
FIG. 6 is a block diagram of a function of a control circuit unit, for causing an HMD system to provide a virtual space according to at least one embodiment of this disclosure.

FIG. 6 is a block diagram of the control circuit unit 120, for causing the HMD system 100 to provide the virtual space 2. The control circuit unit 120 is configured to control an image to be output to the display 112 based on the output data from the movement sensor 130, the eye gaze sensor 140, and the controller 150. The control circuit unit 120 functions as, in cooperation with the hardware in FIG. 2, a display control unit 200, an object control unit 300, a communication control unit 400, and a storage unit 500. The functions of the display control unit 200 and the object control unit 300 may be achieved through the cooperation of the processor and the memory. The function of the communication control unit 400 may be achieved through the cooperation of the processor and the communication interface. The function of the storage unit 500 may be achieved through the cooperation of the memory and the storage.

The display control unit 200 includes a virtual space defining unit 210, an HMD movement detecting unit 220, a field of view direction specifying unit 220a, a line of sight detecting unit 230, a line of sight direction specifying unit 230a, a reference line of sight specifying unit 240, a field of view region determining unit 250, and a field of view image generating unit 260. The object control unit 300 includes a virtual camera control unit 310, a character control unit 320, an input detecting unit 330, a temporal-display control unit 340, a determining unit 350, and a rendering unit 360. The communication control unit 400 includes a requesting unit 410 configured to request various kinds to data to an external device 160 via a network NW, and a communication processing unit 420 configured to process the communication between the requiring unit 410 and the external device 160. The storage unit 500 includes a space information storing unit 510, an object information storing unit 520, and a user information managing unit 530.

Figure 7:
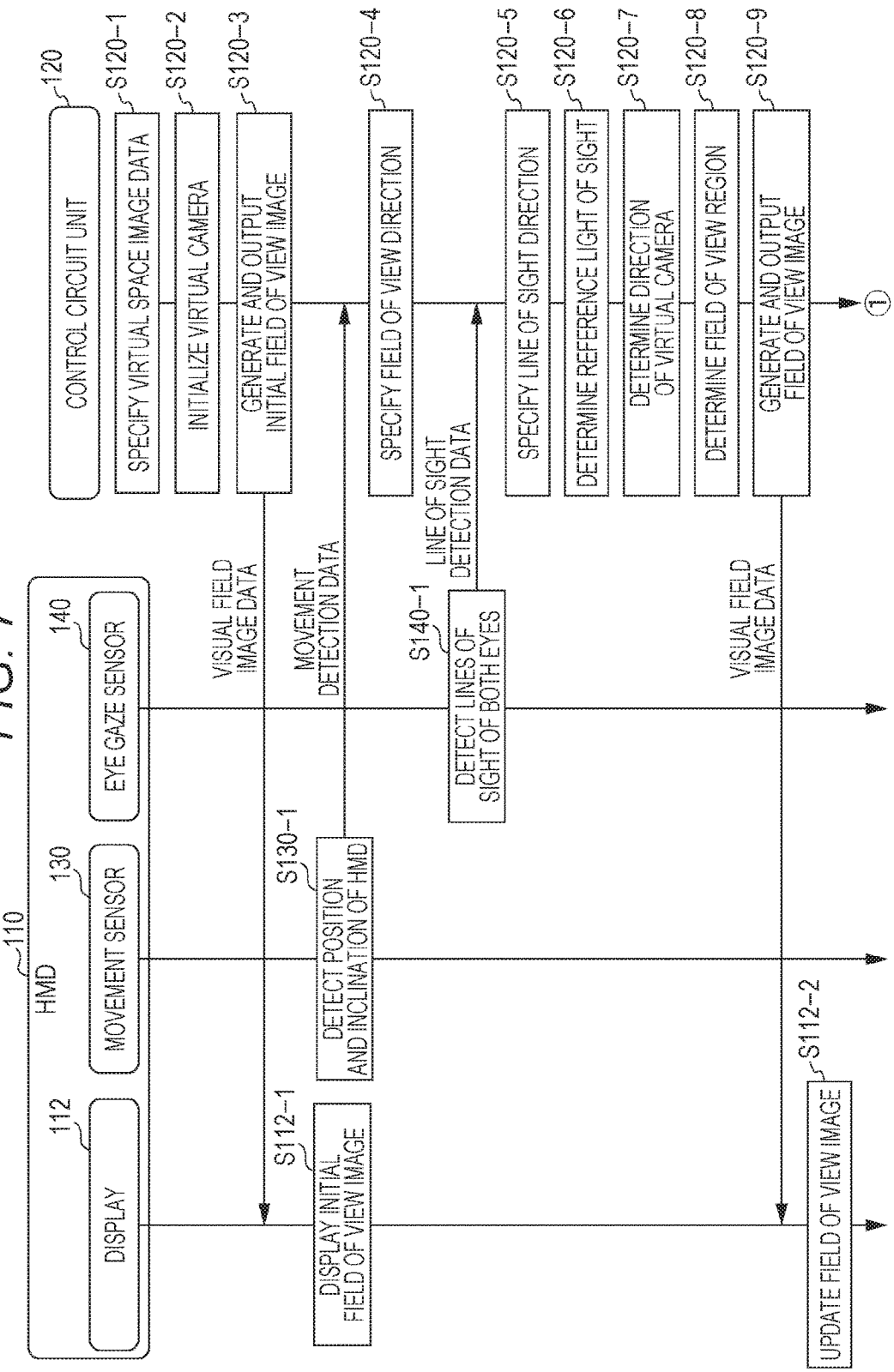
FIG. 7 is a flow chart of processing to be executed in an HMD system according to at least one embodiment of this disclosure.

With reference to FIG. 6 and FIG. 7, processing to be executed in the HMD system 100 for providing the virtual space 2 is described. The virtual space 2 may be provided through interaction between the HMD 110 and the control circuit unit 120.

The virtual space defining unit 210 refers to the user information managing unit 530 to specify the virtual space 2 to be provided to the user. Then, the virtual space defining unit 210 refers to the space information storing unit 510 to specify virtual space image data relating to a virtual space image 22 for forming the virtual space 2 in which the user is immersed (S120-1). With this, the virtual space 2 for immersing the user is defined by the control circuit unit 120.

The virtual camera control unit 310 arranges the virtual camera 1 at the initial position (for example, the center 21 in FIG. 4) in the virtual space 2. At this time, the direction of the virtual camera 1 may be set so as to be synchronized with the UVW visual field coordinate system of the HMD 110, or may be set to a predetermined direction in the virtual space 2. With this, in the virtual space 2, the virtual camera 1 is initialized (S120-2). The field of view region determining unit 250 determines the field of view region 23 as described later based on the UVW visual field coordinate system of the virtual camera 1. The field of view image generating unit 260 generates, as a field of view image, a part of the virtual space 2 on which a region corresponding to the field of view region 23 is projected, and outputs field of view image data to the HMD 110 (S120-3). The HMD 110 receives the image data to cause the display 112 to display the field of view image (S112-1).

When the user inputs an operation, for example, a movement or an inclination of the HMD 110, the movement sensor 130 detects the position or the inclination of the HMD 110 (S130-1). Movement detection data of the movement sensor 130 is transmitted to the control circuit unit 120, and the HMD movement detecting unit 220 receives the position information and the inclination information of the HMD 110. The field of view direction specifying unit 220a specifies the UVW visual field coordinate system based on the position information or the inclination information of the HMD 110, to thereby specify the roll direction (W) as the field of view direction (S120-4).

In response to the eye gaze sensor 140 detecting the lines of sight of the user's eyes (S140-1), the information is transmitted to the control circuit unit 120. The line of sight detecting unit 230 specifies the directions of the lines of sight of the user's eyes, to thereby specify the line of sight direction N0 in which the user focuses his or her gaze (S120-5).

The reference line of sight specifying unit 240 specifies the field of view direction or the line of sight direction N0 as a reference slight line 5 (S120-6). In at least one embodiment, the field of view direction is specified as the reference slight line 5. When the position (base point) or the direction of the reference slight line 5 varies from the initial state of the virtual camera 1, the direction and the position (first position) of the virtual camera 1 are determined based on the reference slight line 5 after the variation (S120-7).

The field of view region determining unit 250 determines the field of view region 23 based on the direction and the position of the virtual camera 1 (S120-8). In FIG. 4, the field of view region 23 is a part of the virtual space 2 that forms the field of view of the user wearing the HMD 110. The field of view region 23 is defined based on the reference slight line 5.

Figure 8:
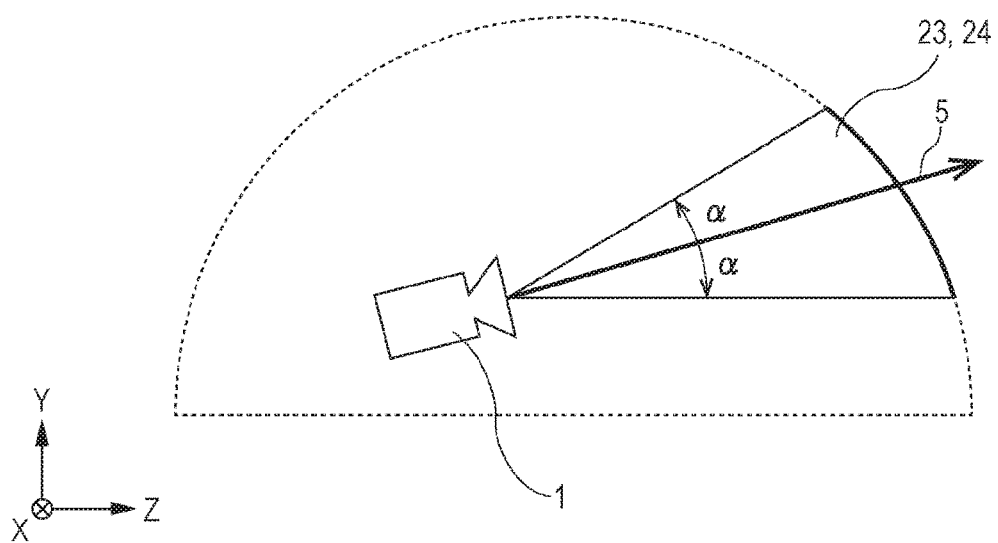
FIG. 8 is a YZ cross-sectional view in which a field of view region is viewed from an X direction according to at least one embodiment of this disclosure.
Figure 9:
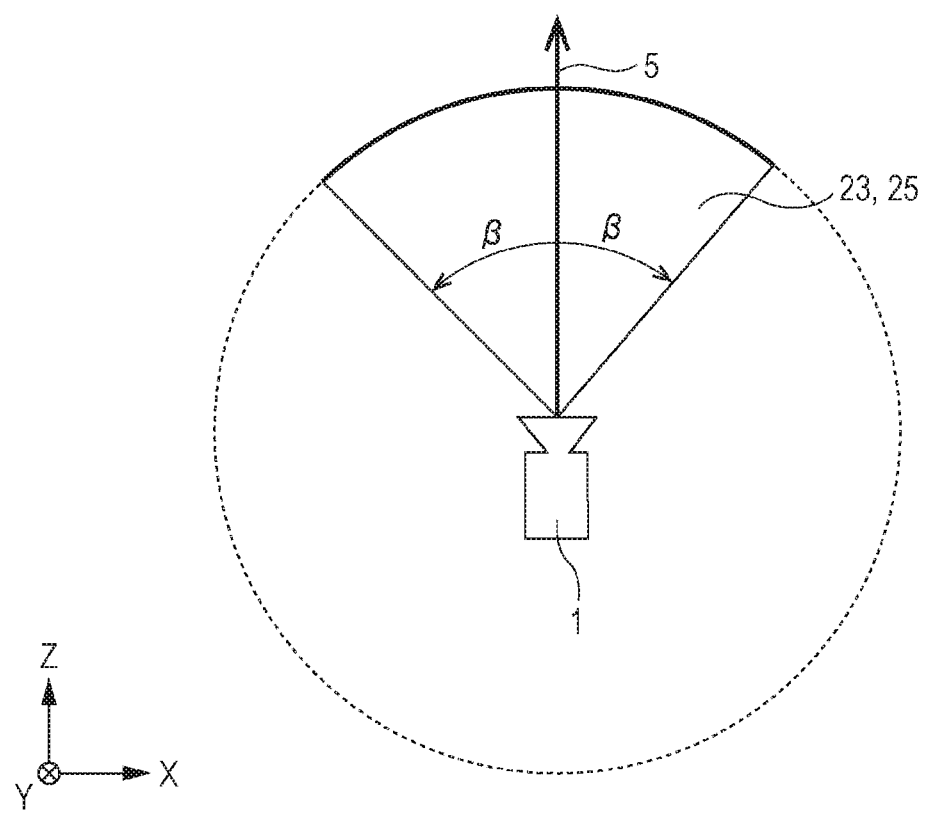
FIG. 9 is an XZ cross-sectional view in which the field of view region is viewed from a Y direction according to at least embodiment of this disclosure.

FIG. 8 is a YZ cross-sectional view in which the field of view region 23 is viewed from an X direction, and FIG. 9 is an XZ cross-sectional view in which the field of view region 23 is viewed from a Y direction. The field of view region 23 has a first region 24 (see FIG. 8) that is a range defined by the reference slight line 5 and a YZ cross section of the virtual space image 22, and a second region 25 (see FIG. 9) that is a range defined by the reference slight line 5 and an XZ cross section of the virtual space image 22. The first region 24 is set as a range including a polar angle α with the reference slight line 5 being the center. The second region 25 is set as a range including an azimuth β with the reference slight line 5 being the center.

The field of view image generating unit 260 generates a field of view image based on the field of view region 23 to output the generated image to the display 112 (S120-9). The HMD 110 receives the visual field image data to update the field of view image to be displayed on the display 112 (S112-2).

Figure 10:
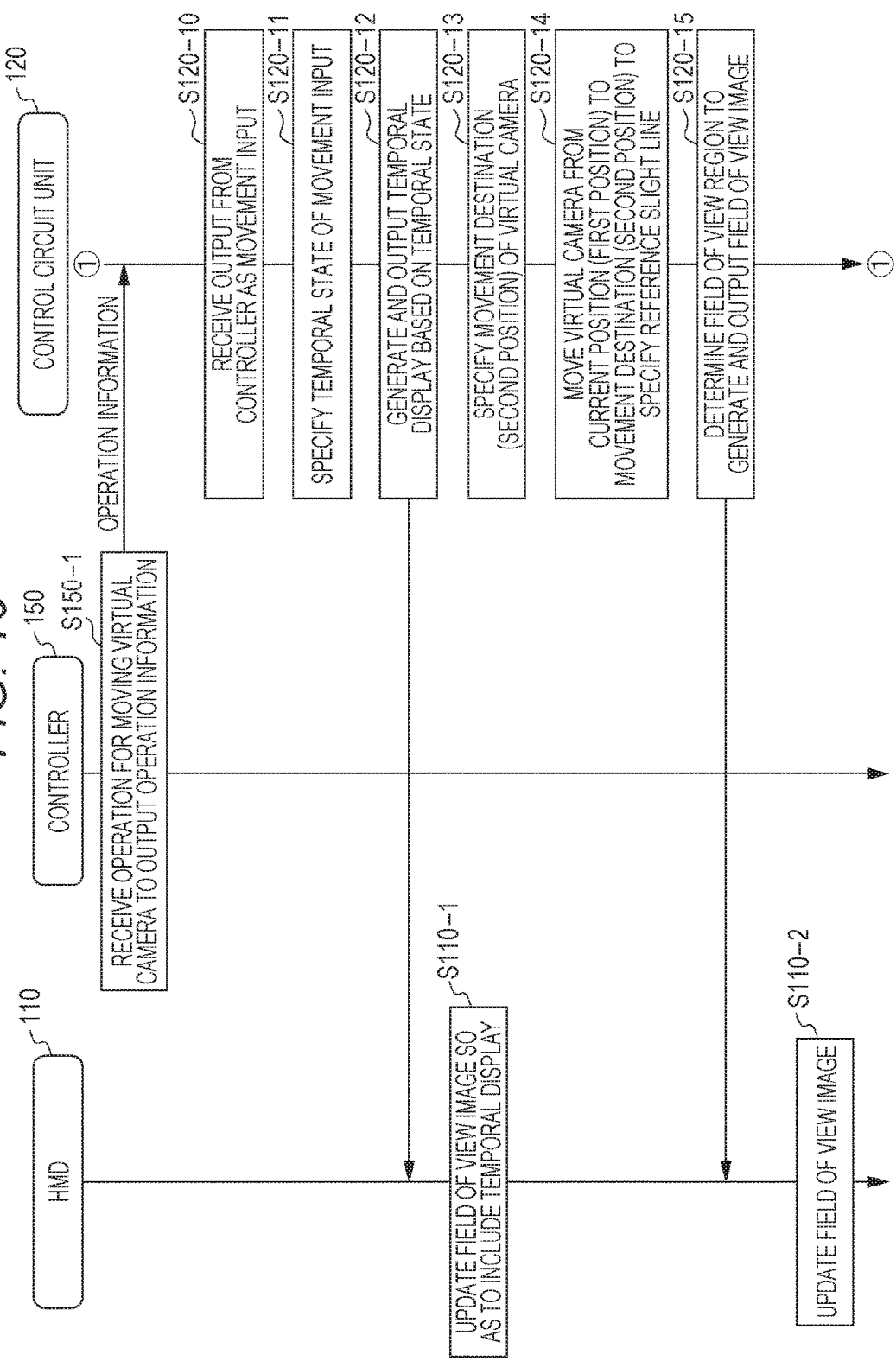
FIG. 10 is a flow chart of processing to be executed in an HMD system according to at least one embodiment of this disclosure.

With reference to FIG. 6, FIG. 10, and subsequent figures, description is given of a specific example of the virtual space 2 to be provided to the user, and an example of the processing to be executed in the HMD system 100 for providing the virtual space 2 to the user. FIG. 10 and FIG. 15 are flow charts of the processing to be executed in the HMD system 100. FIG. 11A, FIG. 12A, FIG. 13A, FIG. 14A, and FIG. 16A are the field of view images, and FIG. 11B, FIG. 12B, FIG. 13B, FIG. 14B, and FIG. 16B are the position and the direction of the virtual camera 1 for generating the field of view images. In at least one embodiment, the virtual space 2 is exemplified as one scene of an action game in the HMD system 100. This description uses the example that the user aims to attack an enemy character EC with use of a weapon, for example, a gun, while hiding behind a tree object TO in the virtual space 2. The user can experience, through the HMD 110, a first-person perspective of a character attacking the enemy character EC. In this case, a position of a player character to be experienced by the user and the position of the virtual camera 1 are regarded as the same position.

Figure 11B:
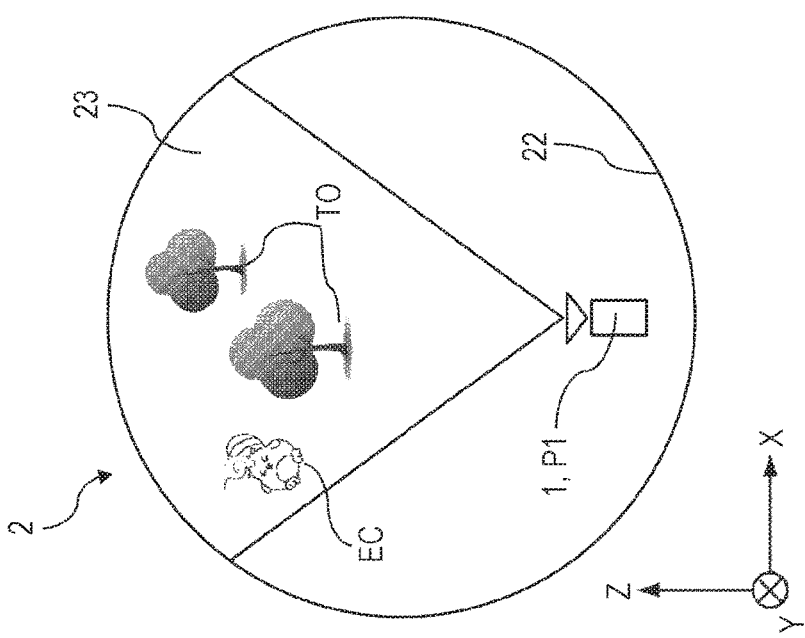
FIG. 11A and FIG. 11B are diagrams of a virtual space in a state in which a virtual camera is arranged at a first position according to at least one embodiment of this disclosure.
Figure 11A:
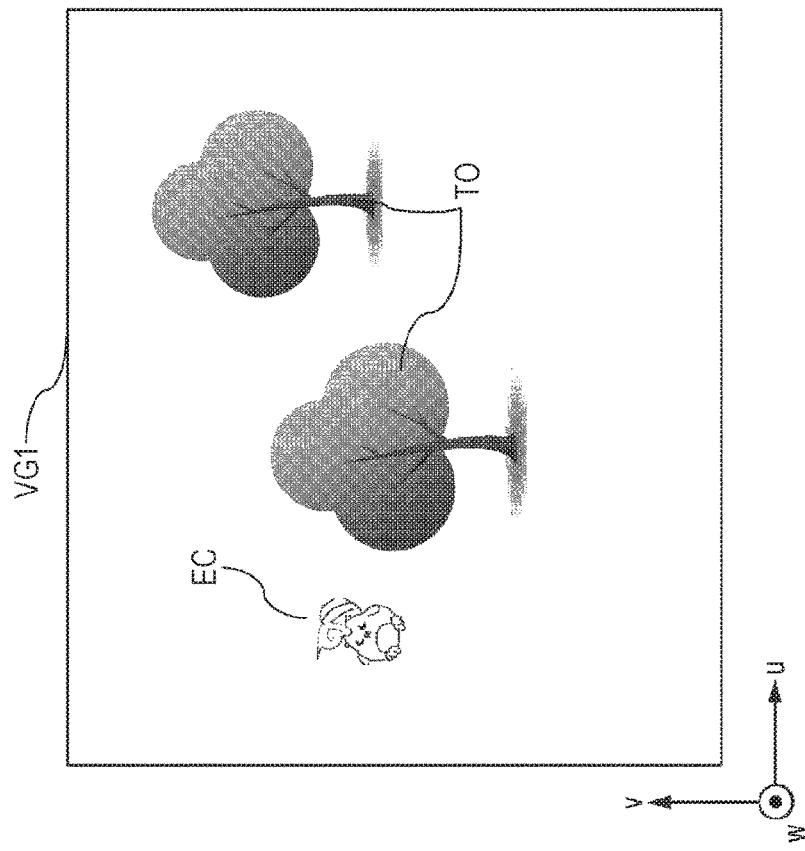

In FIG. 11B, the virtual camera 1 is arranged at a first position P1. In this case, a field of view image VG1 includes the enemy character EC, two tree objects TO, and a part of the virtual space image 22 that is included in the field of view region 23, which serves as a background.

This description uses the example that the user aims to attack the enemy character EC from behind the tree object TO. In this case, the user inputs, to the controller 150, an operation for moving the player character (that is, the virtual camera 1 in this example). The controller 150 receives this operation to output operation information to the control circuit unit 120 (S150-1).

The operation information output from the controller 150 includes information for specifying a temporal state of the operation input. For example, when the operation input to the controller 150 is an operation of continuously contacting to the touch panel of the controller 150 or an operation of holding down a predetermined button of a game console, the temporal state is a duration for which the contacting operation or the holding-down operation is continued. When the operation input to the controller 150 is an operation of successively tapping the touch panel of the controller 150 or an operation of successively pressing a predetermined button of the game console, the temporal state is the number of times that the tapping operation or the pressing operation is input within a predetermined time period.

When the control circuit unit 120 receives the output from the controller 150, the input detecting unit 330 receives the output as movement input (S120-10). The determining unit 350 specifies the temporal state included in the movement input (S120-11). The temporal-display control unit 340 generates a temporal display TD1 as in FIG. 12B based on the temporal state. The rendering unit 360 generates the field of view image VG1 such that the temporal display TD1 is included in the field of view image VG1 output to the field of view image VG1 to the HMD 110 (S120-12). The HMD 110 receives the field of view image VG1 to cause the display 112 to display the field of view image VG1, to thereby update the field of view image VG1 (S110-1).

The determining unit 350 specifies a second position P2 that is a movement destination of the virtual camera 1 based on the temporal state included in the movement input (S120-13). In at least one embodiment, when the temporal state is specified as the duration for which the operation input to the controller 150 is continued, the second position P2 is specified based on the continued duration. Specifically, the second position P2 is set to be farther from the first position P1 as the continued duration is increased. The distance between the second position P2 and the first position P1 is proportionally or exponentially related to the continued duration, in at least one embodiment. In at least one embodiment, a distance change amount may be reduced as the continued duration is increased. When the temporal state is specified as the number of times that the operation input to the controller 150 is input within a predetermined time period, the second position P2 is specified based on the number of times of input. Specifically, the second position P2 is set to be farther from the first position P1 as the number of times of input is increased. A distance between the second position P2 and the first position P1 is proportionally or exponentially related to the number of times of input, in at least one embodiment. In at least one embodiment, the distance change amount may be reduced as the number of times of the input within the predetermined time period is increased.

Further, the determining unit 350 may specify the direction of the second position P2 based on the reference slight line 5. Specifically, as in FIG. 12A and FIG. 12B, the direction of the second position P2 may be specified based on the field of view direction. In at least one embodiment, when the player character is a character that walks or runs to move along the ground, the field of view direction is projected on the XY plane to specify the direction to the second position P2. In at least one embodiment, when the player character is able to fly, the direction to the second position P2 may be specified toward the field of view direction.

When the second position P2 is specified as described above, the temporal-display control unit 340 displays the temporal display TD1 between the position of the virtual camera 1 (that is, the first position P1) and the second position P2, in at least one embodiment. In at least one embodiment, the temporal-display control unit 340 display a bar-like temporal display TD1 such that the temporal display TD1 is extended from the virtual camera 1 to the second position P2 as in FIG. 12A and FIG. 12B. With this, the user can easily understand the movement destination to which the player character (virtual camera 1) moves as a result of the received input movement from the controller 150. Further, as described later, the user can predict the direction in which the field of view is moved when the virtual camera 1 is moved to the second position P2. As a result, a visually induced motion sickness (so-called VR sickness) due to the movement of the virtual camera 1 may be alleviated, in some instances.

Figure 13B:
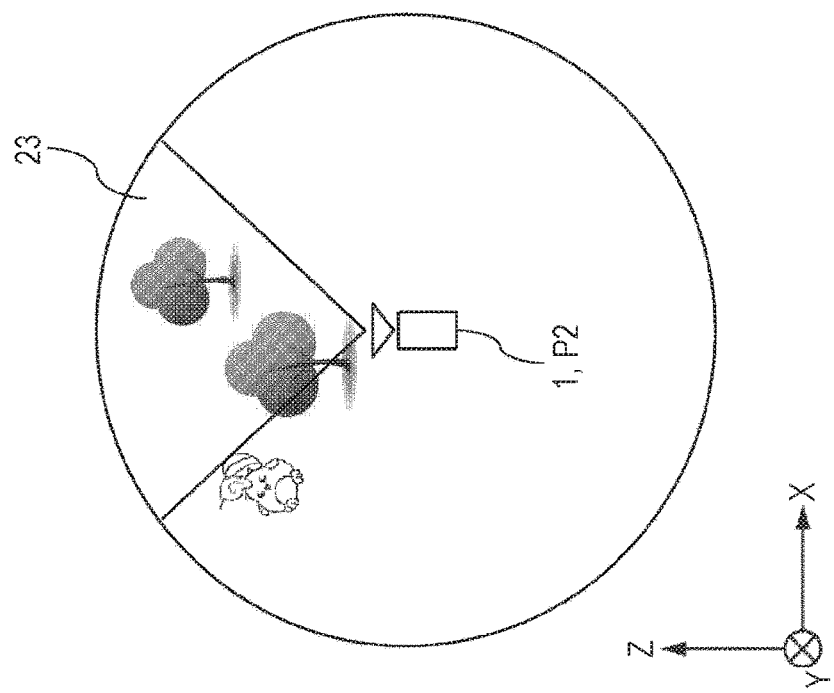
FIG. 13A and FIG. 13B are diagrams of a virtual space in a state in which a virtual camera is arranged at a second position according to at least one embodiment of this disclosure.
Figure 13A:
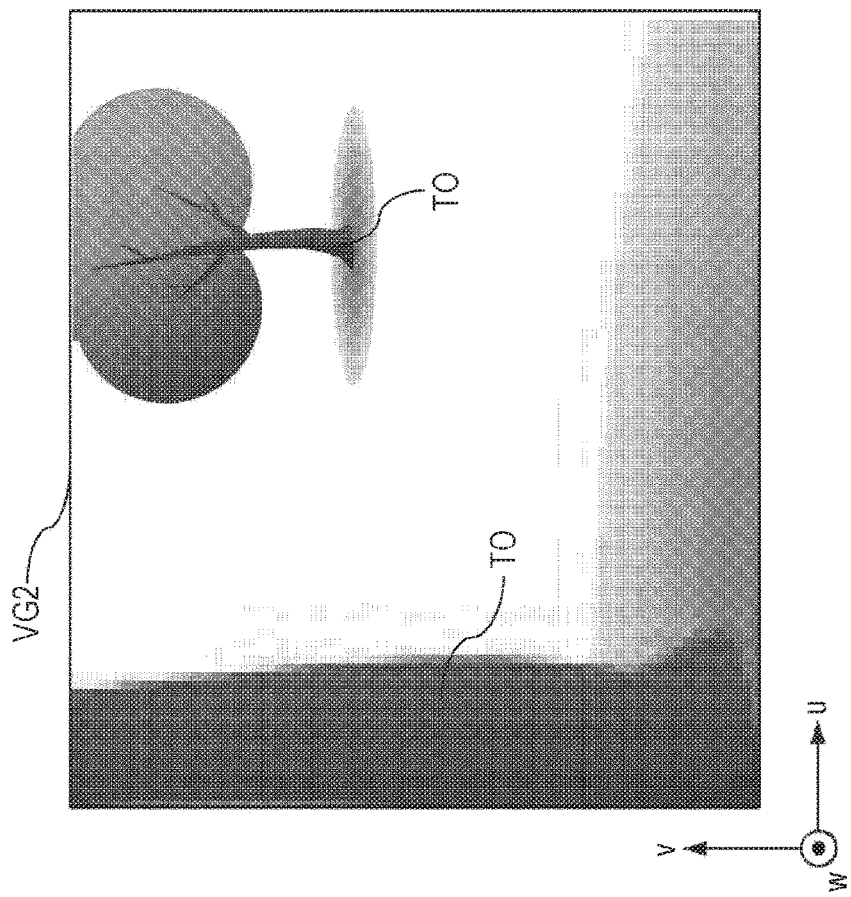

In FIG. 13A and FIG. 13B, the virtual camera control unit 310 moves the virtual camera 1 from the current position (first position P1) to the second position P2. Then, the reference line of sight specifying unit 240 specifies the reference slight line 5 by detecting the movement of the HMD 110 as described above (S120-14). In at least one embodiment, the base point of the reference slight line 5 is the second position P2, and the direction of the reference slight line 5 is determined based on the inclination of the HMD 110. With this, the UVW visual field coordinate system is specified based on the position and the direction of the virtual camera 1. The field of view region determining unit 250 specifies the field of view region 23 based on the reference slight line 5 as described above. The field of view image generating unit 260 generates the field of view image VG1 based on the field of view region 23 as described above to output the field of view image VG1 to the HMD 110 (S120-15). The HMD 110 receives the field of view image VG1 to cause the display 112 to display the field of view image VG1, to thereby update the field of view image VG1 to a field of view image VG2 (S110-2).

During a transition period in which the virtual camera 1 is moved from the first position P1 to the second position P2, the movement of the HMD 110 does not match with the movement for updating the field of view image VG1, and hence the user may suffer from VR sickness, in some instances. In at least one embodiment, at least the direction of the virtual camera 1 is synchronized with the movement of the HMD 110 during the transition period. Further, during the transition period, reducing processing of the amount of information to be visually recognized by the user from the field of view image VG1 (for example, reducing the resolution, blurring, reducing the luminance, reducing the brightness, or covering apart of the field of view) may be executed.

After the virtual camera 1 is moved to the second position P2, the user may move the HMD 110 such that the enemy character EC falls within a field of view image VG2' as in FIG. 14A. Then, the user sets a sight S of the weapon onto the enemy character EC to execute an attack operation. The user can set the player character behind the tree object TO so as to attack the enemy character EC while preventing the player character from being noticed by the enemy character EC.

The movement input in at least one embodiment is not limited to the operation information output from the controller 150 described above, and may include the field of view direction and/or the line of sight direction output from the HMD 110. FIG. 15 is a diagram of the processing to be executed in the HMD system 100 when the movement destination of the virtual camera is specified based on the output from the HMD 110. Processing in FIG. 15 that is substantially similar to that of FIG. 10 is represented by the broken lines, and redundant description is omitted.

In FIG. 15, the input detecting unit 330 receives the operation information from the controller 150, to thereby perform setting so that the field of view direction and/or the line of sight direction output from the HMD 110 are/is received as the movement input (S150-1). Further, the input detecting unit 330 receives data relating to the field of view direction and/or the line of sight direction detected in the HMD 110 (S110-3). In at least one embodiment, the following description using an example where the reference slight line 5 is determined based on the field of view direction specified in accordance with the inclination of the HMD 110, to thereby receive the line of sight direction NO as the movement input.

Line of sight detection data output from the HMD 110 includes information for specifying the temporal state of the line of sight direction. When the line of sight detecting unit 230 receives the data relating to the directions of the lines of sight of the user's eyes, the line of sight direction specifying unit 230a specifies the line of sight direction NO as described above. Further, the determining unit 350 specifies a duration for which the line of sight direction NO remains in a predetermined direction (S120-16). With this, the input detecting unit 330 receives the operation information from the controller 150 and the line of sight information as the movement input (S120-17).

The determining unit 350 specifies the duration for which the line of sight direction NO remains in the predetermined direction as the temporal state of the movement input (S120-18). The temporal display control unit 340 generates a temporal display TD2 as illustrated in FIG. 16B based on the temporal state. The rendering unit 360 generates a field of view image VG3 such that the temporal display TD2 is included in the field of view image VG3 to output the field of view image VG3 to the HMD 110 (S120-19). The HMD 110 receives this field of view image VG3 to cause the display 112 to display the field of view image VG3, to thereby update the field of view image VG3 (S110-1).

The determining unit 350 specifies the second position P2 that is the movement destination of the virtual camera 1 based on the temporal state included in the movement input (S120-13). In at least one embodiment, the second position P2 is specified based on the duration for which the line of sight direction NO remains in the predetermined direction. Specifically, the second position P2 is set to be farther from the first position P1 as the duration that the line of sight direction NO remains in the predetermined direction is increased. In at least one embodiment, the distance between the second position P2 and the first position P1 is proportionally or exponentially related to the duration that the line of sight direction NO remains in the predetermined direction. In at least one embodiment, the distance change amount may be reduced as the duration that the line of sight direction NO remains in the predetermined direction is increased.

The determining unit 350 specifies the direction of the second position P2 based on the line of sight direction NO. Specifically, in FIG. 16A and FIG. 16B, the field of view image VG3 is generated based on the reference slight line 5 (in this example, the field of view direction), and the direction of the second position P2 is specified based on the line of sight direction NO. With this, the user can designate a desired position in the field of view image VG3 as the movement destination of the virtual camera 1 with the movement of the line of sight.

Figure 12B:
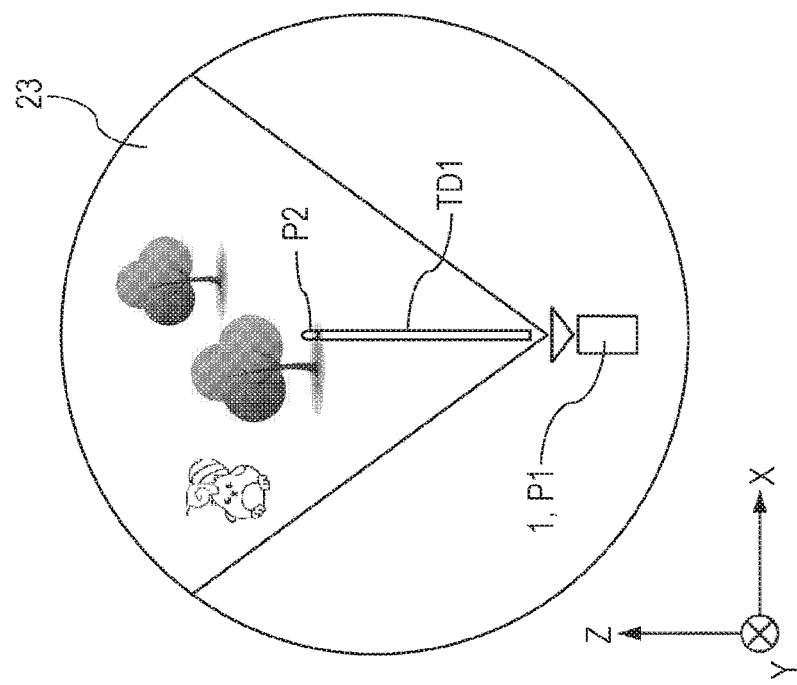
FIG. 12A and FIG. 12B are diagrams of a virtual space in a state in which a virtual camera is arranged at the first position according to at least one embodiment of this disclosure.
Figure 12A:
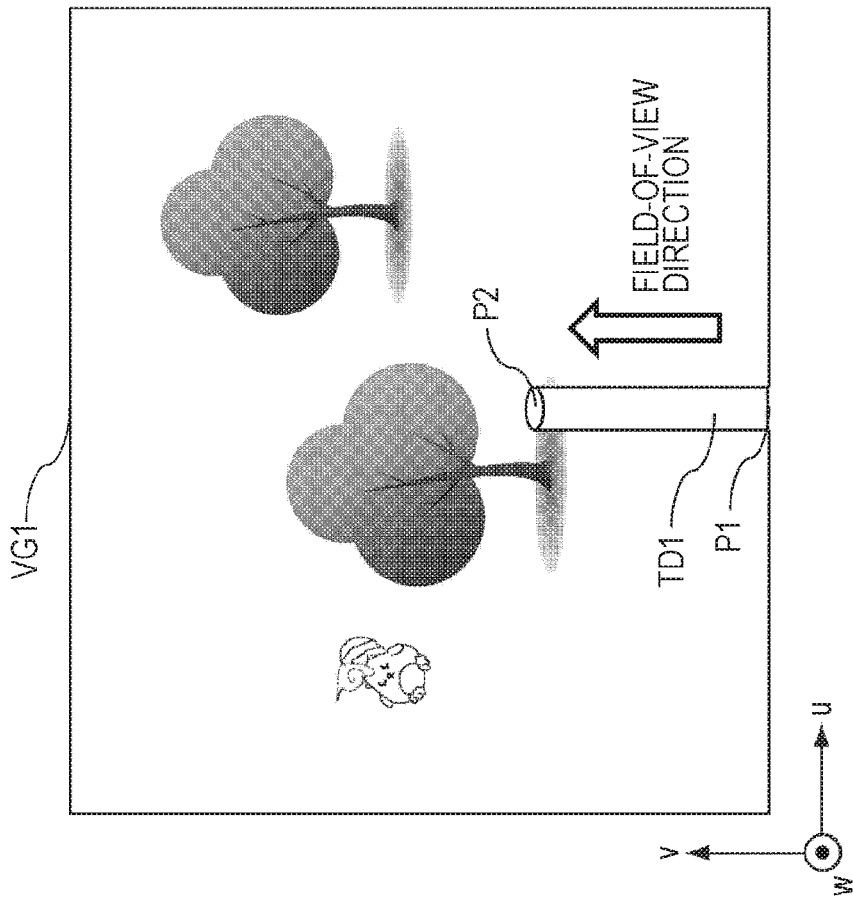

In this example, the distance between the first position P1 and the second position P2 is set to be increased as compared to the example in FIG. 12A and FIG. 12B. That is, when the duration that the line of sight direction NO remains in the predetermined direction is increased, the virtual camera 1 can be moved to a farther position with one movement input operation. However, an amount of time to input the operation for movement in this case is increased in comparison with other embodiments. Hence, in a mode as an action game of at least one embodiment, an unguarded moment may be created for the enemy character EC. An unguarded moment is a period of time when the player character (virtual camera 1) is not protected by an object, e.g., tree object TO, and is within an attack range of an enemy character EC. FIG. 16A is a diagram of a case where the player character is attacked by the enemy character EC in this manner. As described above, the virtual camera 1 is moved based on the temporal state of the movement input, and the timing to perform the movement input depends on the set mode of the second position P2. Therefore, with at least one embodiment, a virtual space having a high entertainment value may be provided.

Embodiments of this disclosure are described above. However, this disclosure is not limited to the embodiments described above. One of ordinary skill in the art would understand that various modifications may be made to the embodiments as long as the modifications do not deviate from the spirit and scope of this disclosure described in the appended claims.

For example, in the above-mentioned embodiments, description is given of an example in which the reference slight line 5 is specified based on the field of view direction, but the reference slight line 5 may be specified based on the line of sight direction. Further, after the field of view region 23 is specified based on the line of sight direction, the direction of the second position P2 may be specified based on the field of view direction.

What is claimed is:

1. A method comprising:
   defining a virtual space for immersing a user;
   defining a virtual camera for determining a field of view region at a first position in the virtual space;
   specifying a reference slight line of the user;
   specifying a direction of the virtual camera based on the reference slight line;
   generating a field of view image corresponding to the field of view region in the virtual space;
   outputting the field of view image to a head-mounted display (HMD);
   receiving a movement input for specifying a movement destination of the virtual camera;
   specifying a temporal state of the movement input;
   moving the virtual camera from the first position to a second position in the virtual space based on the temporal state;
   updating the field of view region in response to the virtual camera reaching the second position;
   generating an updated field of view image based on the updated field of view region; and
   outputting the updated field of view image to the HMD.

2. The method according to claim 1, wherein the movement input is received from a controller in communication with the HMD.

3. The method according to claim 2,
   wherein the movement input comprises information for specifying a duration for which an input to the controller is continued,
   wherein the temporal state comprises the duration for which the input is continued, and
   wherein the second position is set to be farther from the first position as the duration for which the input is continued increases.

4. The method according to claim 2,
   wherein the movement input comprises information for specifying a number of times that a first input to the controller is executed within a predetermined time period,
   wherein the temporal state comprises the number of times that the first input is executed within the predetermined time period, and
   wherein the second position is set to be farther from the first position as the number of times the first input is executed within the predetermined time period increases.

5. The method according to claim 1, further comprising detecting an inclination of the HMD to specify a field of view direction, or to specify a line of sight direction of the user,
   wherein the reference slight line is specified based on the field of view direction or the line of sight direction, wherein the movement input comprises information for specifying a duration in which one of the field of view direction or the line of sight direction remains unchanged, wherein the temporal state comprises the duration for which the one of the field of view direction and the line of sight direction remains unchanged, and wherein the second position is set to be farther from the first position as the duration for which the one of the field of view direction or the line of sight direction remains unchanged is increased.

6. The method according to claim 2, further comprising detecting an inclination of the HMD to specify a field of view direction, or to specify a line of sight direction of the user, wherein the reference slight line is specified based on the field of view direction or the line of sight direction, wherein the movement input comprises information for specifying a duration in which one of the field of view direction or the line of sight direction remains unchanged, wherein the temporal state comprises the duration for which the one of the field of view direction and the line of sight direction remains unchanged, and wherein the second position is set to be farther from the first position as the duration for which the one of the field of view direction or the line of sight direction remains unchanged is increased.

7. The method according to claim 3, further comprising detecting an inclination of the HMD to specify a field of view direction, or to specify a line of sight direction of the user, wherein the reference slight line is specified based on the field of view direction or the line of sight direction, wherein the movement input comprises information for specifying a duration in which one of the field of view direction or the line of sight direction remains unchanged, wherein the temporal state comprises the duration for which the one of the field of view direction and the line of sight direction remains unchanged, and wherein the second position is set to be farther from the first position as the duration for which the one of the field of view direction or the line of sight direction remains unchanged is increased.

8. The method according to claim 4, further comprising detecting an inclination of the HMD to specify a field of view direction, or to specify a line of sight direction of the user, wherein the reference slight line is specified based on the field of view direction or the line of sight direction, wherein the movement input comprises information for specifying a duration in which one of the field of view direction or the line of sight direction remains unchanged, wherein the temporal state comprises the duration for which the one of the field of view direction and the line of sight direction remains unchanged, and wherein the second position is set to be farther from the first position as the duration for which the one of the field of view direction or the line of sight direction remains unchanged is increased.

9. The method according to claim 1, further comprising detecting an inclination of the HMD to specify a field of view direction, or to specify a line of sight direction of the user, wherein the reference slight line is specified based on the field of view direction or the line of sight direction, and wherein the method further comprises displaying a temporal display is based on the temporal state in one of the field of view direction or the line of sight direction.

10. The method according to claim 2, further comprising detecting an inclination of the HMD to specify a field of view direction, or to specify a line of sight direction of the user, wherein the reference slight line is specified based on the field of view direction or the line of sight direction, and wherein the method further comprises displaying a temporal display is based on the temporal state in one of the field of view direction or the line of sight direction.

11. The method according to claim 3, further comprising detecting an inclination of the HMD to specify a field of view direction, or to specify a line of sight direction of the user, wherein the reference slight line is specified based on the field of view direction or the line of sight direction, and wherein the method further comprises displaying a temporal display is based on the temporal state in one of the field of view direction or the line of sight direction.

12. The method according to claim 4, further comprising detecting an inclination of the HMD to specify a field of view direction, or to specify a line of sight direction of the user, wherein the reference slight line is specified based on the field of view direction or the line of sight direction, and wherein the method further comprises displaying a temporal display is based on the temporal state in one of the field of view direction or the line of sight direction.

13. The method according to claim 5, further comprising detecting an inclination of the HMD to specify a field of view direction, or to specify a line of sight direction of the user, wherein the reference slight line is specified based on the field of view direction or the line of sight direction, and wherein the method further comprises displaying a temporal display is based on the temporal state in one of the field of view direction or the line of sight direction.

14. The method according to claim 9, further comprising outputting the temporal display to the HMD for the virtual space between the virtual camera and the second position.

15. The method according to claim 9, further comprising outputting the temporal display to the HMD such that the temporal display is extended from the virtual camera to the second position.

16. The method according to claim 14, further comprising outputting the temporal display to the HMD such that the temporal display is extended from the virtual camera to the second position.

17. A system comprising:
a non-transitory computer readable medium configured to store instructions; and
a processor connected to the non-transitory computer readable medium, wherein the processor is configured to execute the instructions for:
defining a virtual space for immersing a user;
defining a virtual camera for determining a field of view region at a first position in the virtual space;
specifying a reference slight line of the user;
specifying a direction of the virtual camera based on the reference slight line;
generating a field of view image corresponding to the field of view region in the virtual space;

outputting the field of view image to a head-mounted display (HMD);
receiving a movement input for specifying a movement destination of the virtual camera;
specifying a temporal state of the movement input;
moving the virtual camera from the first position to a second position in the virtual space based on the temporal state;
updating the field of view region in response to the virtual camera reaching the second position;
generating an updated field of view image based on the updated field of view region; and
outputting the updated field of view image to the HMD.

18. The system according to claim 17, wherein the movement input comprises is received from a controller in communication with the HMD.

19. The system according to claim 18,
wherein the movement input comprises information for specifying a duration for which an input to the controller is continued,
wherein the temporal state comprises the duration for which the input is continued, and
the processor is configured to set the second position to be farther from the first position as the duration for which the input is continued increases.

20. The system according to claim 18,
wherein the movement input comprises information for specifying a number of times that a first input to the controller is executed within a predetermined time period,
wherein the temporal state comprises the number of times that the first input is executed within the predetermined time period, and
the processor is configured to set the second position to be farther from the first position as the number of times the first input is executed within the predetermined time period increases.

* * * * *